US010713520B2

(12) United States Patent
Irrgang et al.

(10) Patent No.: US 10,713,520 B2
(45) Date of Patent: Jul. 14, 2020

(54) METHOD OF TAKING A PICTURE WITHOUT GLARE

(71) Applicant: Engineering Innovation, Inc., Lafayette, IN (US)

(72) Inventors: Rebecca Irrgang, Lafayette, IN (US); Dale McCoy, West Lafayette, IN (US)

(73) Assignee: Engineering Innovation, Inc., Lafayette, IN (US)

( * ) Notice: Subject to any disclaimer, the term of this patent is extended or adjusted under 35 U.S.C. 154(b) by 92 days.

(21) Appl. No.: 15/728,640

(22) Filed: Oct. 10, 2017

(65) Prior Publication Data

US 2018/0121746 A1 May 3, 2018

Related U.S. Application Data

(60) Provisional application No. 62/413,572, filed on Oct. 27, 2016.

(51) Int. Cl.
| | |
|---|---|
| *G06K 9/00* | (2006.01) |
| *G06K 9/34* | (2006.01) |
| *H04N 5/235* | (2006.01) |
| *H04N 5/243* | (2006.01) |
| *G06K 9/20* | (2006.01) |
| *B07C 3/14* | (2006.01) |
| *B07C 5/28* | (2006.01) |

(52) U.S. Cl.
CPC .............. *G06K 9/344* (2013.01); *B07C 3/14* (2013.01); *B07C 5/28* (2013.01); *G06K 9/209* (2013.01); *G06K 9/2027* (2013.01); *H04N 5/2351* (2013.01); *H04N 5/2354* (2013.01); *H04N 5/2355* (2013.01); *H04N 5/243* (2013.01); *G06K 2009/2045* (2013.01); *G06K 2209/01* (2013.01)

(58) Field of Classification Search
CPC ...... G06K 9/344; G06K 9/2027; G06K 9/209; G06K 2009/2045; G06K 2209/01; B07C 3/14; B07C 5/28; H04N 5/2351; H04N 5/2354; H04N 5/2355; H04N 5/243
See application file for complete search history.

(56) References Cited

U.S. PATENT DOCUMENTS

| | | |
|---|---|---|
| 6,021,210 A | 2/2000 | Camus et al. |
| 6,088,612 A | 7/2000 | Blair |

(Continued)

*Primary Examiner* — Gregory M Desire
(74) *Attorney, Agent, or Firm* — Woodard, Emhardt, Henry, Reeves & Wagner, LLP

(57) ABSTRACT

A glare reducing optical recognition system that recognizes alphanumeric text wherein the system includes a first light emitter that emits light in a first direction and a second light emitter that emits light in a second direction different from the first direction. The system includes an image capturing device that captures a first image of alphanumeric text illuminated by the first light emitter emitting light in the first direction, and a second image of the alphanumeric text illuminated by the second light emitter emitting light in the second direction. The system includes an image processor that constructs a glare reduced image by comparing sections of the first image with corresponding sections of the second image and selecting the section with the least luminosity to populate the corresponding section of the glare reduced image. The system may include a character recognition processor, a label producing apparatus, and/or a conveyance system.

21 Claims, 4 Drawing Sheets

(56) References Cited

U.S. PATENT DOCUMENTS

| | | | | |
|---|---|---|---|---|
| 6,738,496 B1* | 5/2004 | Van Hall | ............... | G06K 9/38 |
| | | | | 382/101 |
| 6,965,460 B1* | 11/2005 | Gann | ................. | H04N 1/193 |
| | | | | 358/453 |
| 7,158,099 B1* | 1/2007 | Berube | ................. | G03B 15/03 |
| | | | | 345/9 |
| 7,204,420 B2 | 4/2007 | Barkan et al. | | |
| 7,398,927 B2 | 7/2008 | Olmstead et al. | | |
| 7,561,312 B1* | 7/2009 | Proudfoot | ......... | H04N 1/00013 |
| | | | | 348/370 |
| 7,619,664 B2 | 11/2009 | Pollard et al. | | |
| 7,630,002 B2 | 12/2009 | Jenkins | | |
| 8,204,339 B2* | 6/2012 | Heaney, Jr. | ....... | G06K 9/00449 |
| | | | | 382/103 |
| 8,208,729 B2* | 6/2012 | Foss | ................. | G09B 21/001 |
| | | | | 382/181 |
| 8,212,857 B2 | 7/2012 | Keam | | |
| 8,600,196 B2* | 12/2013 | King | ................... | G06Q 30/00 |
| | | | | 358/474 |
| 8,730,356 B2 | 5/2014 | Ansfield et al. | | |
| 9,129,177 B2* | 9/2015 | Baik | ..................... | G06K 9/18 |
| 9,854,180 B2* | 12/2017 | Davis | ................. | H04N 5/238 |
| 9,870,520 B1* | 1/2018 | Becker | ................ | G06K 9/6262 |
| 2006/0222260 A1* | 10/2006 | Sambongi | ............. | G06T 5/006 |
| | | | | 382/274 |
| 2007/0280534 A1* | 12/2007 | Foss | ...................... | G06K 9/20 |
| | | | | 382/182 |
| 2016/0267355 A1* | 9/2016 | Piao | ...................... | B07C 3/14 |
| 2018/0121746 A1* | 5/2018 | Irrgang | ................. | G06K 9/344 |
| 2018/0324929 A1* | 11/2018 | Brock | ................... | H05B 45/10 |
| 2018/0330472 A1* | 11/2018 | Elhage | ................. | G06T 3/4038 |

* cited by examiner

METHOD OF TAKING A PICTURE WITHOUT GLARE

CROSS-REFERENCE TO RELATED APPLICATIONS

This application claims the benefit of U.S. Provisional Application No. 62/413,572, filed Oct. 27, 2016, which is hereby incorporated by reference.

BACKGROUND

This disclosure relates generally to a glare reducing optical recognition system which creates a glare reduced image.

As further background, image capture devices are used to read and capture a variety of images of a document. In some instances, the image capture devices use two images, each being illuminated by a unique light source. The two images are combined to remove specular reflection caused by each light source. However, glare spots may still be present from ambient light unless the pictures are taken in areas of low ambient light levels. Thus additional processing and time is required to take additional images at low ambient light levels and subtract these from the two images. Other image capture devices capture two images of a barcode, each being illuminated by a unique light source. The two images are then compared or stitched together to obtain a glare free image of the barcode. Thus additional processing and time is also required in these devices.

Thus, there is a need for improvement in this field.

SUMMARY

This disclosure details, in certain aspects, unique devices and methods for recognizing alphanumeric text. One such device includes a glare reducing optical recognition system for recognizing alphanumeric text. The system includes a first light emitter configured and arranged to emit light in a first direction and a second light emitter configured and arranged to emit light in a second direction different from the first direction. The system also includes an image capturing device that is configured to capture a first image of alphanumeric text illuminated by the first light emitter emitting light in the first direction, and a second image of the alphanumeric text illuminated by the second light emitter emitting light in the second direction. The system further includes an image processor configured to construct a glare reduced image by comparing sections of the first image with corresponding sections of the second image and selecting the section with the least luminosity to populate the corresponding section of the glare reduced image and a character recognition processor configured to automatically perform optical character recognition on alphanumeric text contained within the glare reduced image produced by said image capturing device.

The system, in some forms, will have one or more of the following features which may be combinable in any configuration. The alphanumeric text is coupled to an object and the system further comprises an association processor configured and arranged to associate identification information of the object with information obtained from the optical character recognition of the alphanumeric text. In one form, the alphanumeric text is address information and the identification information is a zip code determined from the address information. In some embodiments, the system further comprises a label producing apparatus. In one such embodiment, the label producing apparatus is configured and arranged to produce a label encoded with identification information obtained from the optical character recognition of the alphanumeric text. Optionally, the label includes zip code information obtained from the optical character recognition of the alphanumeric text. The system can have a central light ray emitted from the first light emitter at the first direction forms an angle of between forty-five and one hundred and thirty-five degrees with the central light ray emitted from the second light emitter in the second direction. The system can have the first image and the second image are of substantially the same target area. In some embodiments, the system also includes a hood configured and arranged to inhibit ambient light from reaching the alphanumeric text. The image capturing device can also be configured to capture images in the visible light spectrum. The first and second light emitters can also be configured to emit light in the visible light spectrum. Optionally, the system includes a conveyance system configured and arranged to present multiple examples of alphanumeric text to the image capturing device sequentially. In some embodiments, the system further includes a sensor configured and arranged to trigger the capture of images when alphanumeric text is within the field of view of the image capturing device. In one form, the image processor compares pixels between the first image and second image. Optionally, the image capturing device is configured to capture images at varying focal lengths.

Another device includes a glare reducing optical capture system for addressed mail items that are weighed. The system includes a platform having a sensor configured and arranged to detect changes in weight caused by addressed mail parcels placed upon the platform, a first light emitter configured and arranged to emit light in a first direction, and a second light emitter configured and arranged to emit light in a second direction different from the first direction. The system also includes an image capturing device configured to capture a first image of the address of a parcel of the addressed mail parcels illuminated by the first light emitter emitting light in the first direction, and a second image of the address of a parcel of the addressed mail parcels illuminated by the second light emitter emitting light in the second direction. The system also includes an image processor configured to construct a glare reduced image by comparing sections of the first image with corresponding sections of the second image and selecting the section with the least luminosity to populate the corresponding section of the glare reduced image.

The system, in some forms, will have one or more of the following features which may be combinable in any configuration. In one form, the system further comprises an association processor configured and arranged to associate weight information of a parcel of the addressed mail parcels with information obtained from optical character recognition of the address of the parcel. In another form, the system further includes a conveyance system configured and arranged to sequentially maneuver multiple objects onto the platform. Optionally, the first image is captured in response to changes of weight sensed by the sensor. In one form, the weight of the parcel is sensed using a differential algorithm.

A method for capturing a glare reduced image and processing the same includes positioning alphanumeric text within a field of view of an image capturing device, illuminating the alphanumeric text with light emitted from a first light emitter configured and arranged to emit light in a first direction, capturing a first image of the alphanumeric text when the alphanumeric text is illuminated by the first light emitter with an image capturing device, illuminating the alphanumeric text with light emitted from a second light emitter configured and arranged to emit light in a second direction different from the first direction, capturing a second image of the alphanumeric text when the alphanumeric text is illuminated by the second light emitter with the image capturing device, and creating a glare reduced image of the alphanumeric text by comparing corresponding sections of the first image and the second image and selecting the section with the least luminosity to populate the corresponding section of the glare reduced image.

The method, in some forms, will have one or more of the following features which may be combinable in any configuration. The method includes wherein multiple alphanumeric texts are captured, and each alphanumeric text has a corresponding captured first image, second image, and glare reduced image. In one form, the method includes the sequence of illuminating the first light emitter and the second light emitter for subsequent alphanumeric texts follows the following pattern: a first alphanumeric text image capture process that includes the first light emitter used to capture the first image, the second light emitter used to capture the second image, and a second alphanumeric text image capture process: the second light emitter used to capture a first image, and the first light emitter used to capture a second image. In another form, the method includes the alphanumeric text is substantially stationary compared to the image capturing device during the capture of both the first image and the second image. Optionally, the method includes the capture of the first image being automatic in response to a sensor. Further, the sensor is configured to sense weight in one embodiment. The method can further comprise generating a label encoded with information obtained from the glare reduced image. In one embodiment, the method includes the information encoded on the label is in a different format as the information encoded in the alphanumeric text. The method includes wherein the different format is machine readable or a barcode. The method includes wherein the light emitted from the first light emitter is polarized differently than the light emitted by the second light emitter in a different embodiment.

Other objects, embodiments, forms, features, advantages, aspects, and benefits of the claimed invention shall become apparent from the detailed description and drawings included herein.

DESCRIPTION OF THE SELECTED EMBODIMENTS

Figure 1:
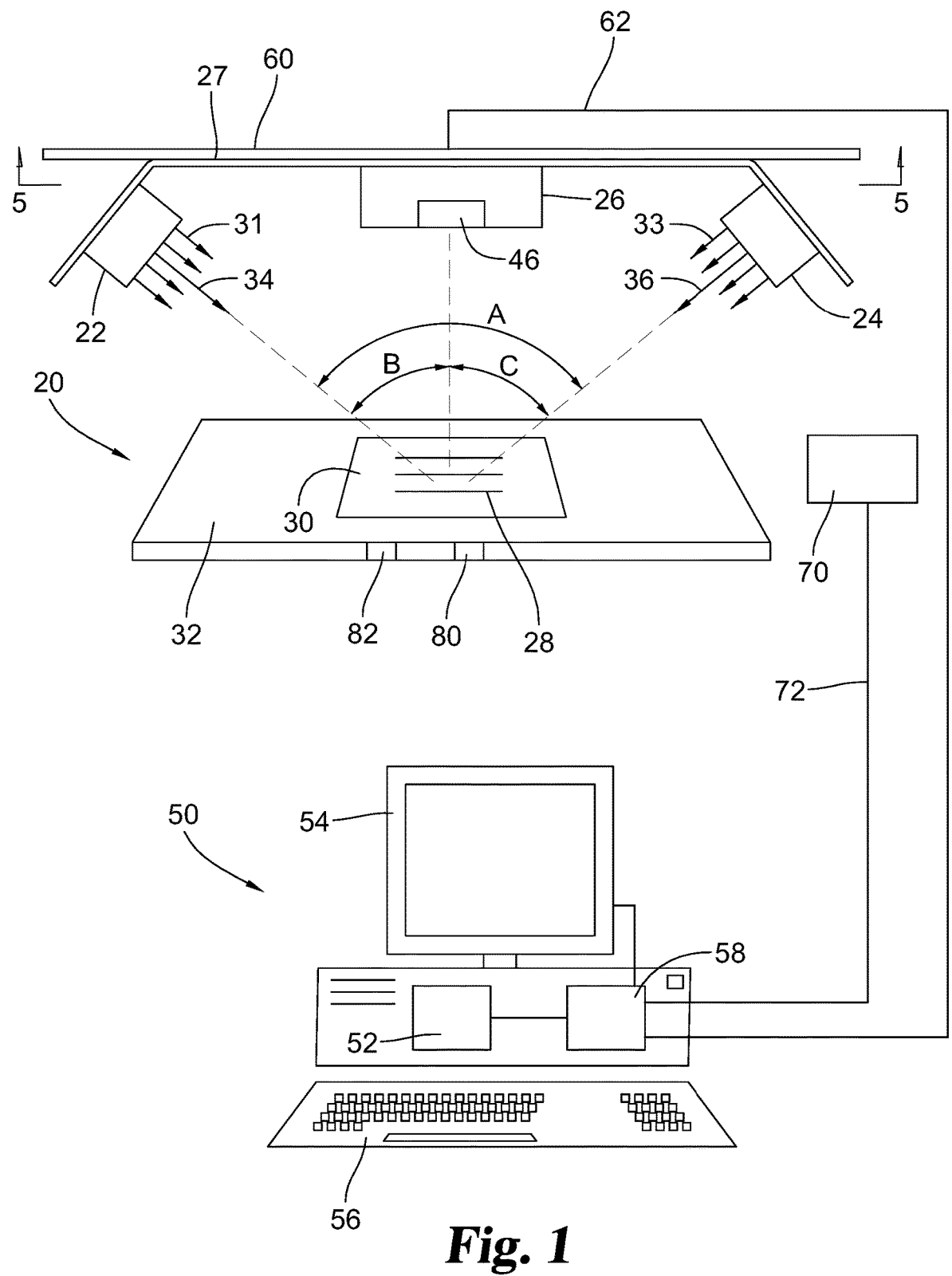
FIG. 1 is a schematic illustration of one embodiment of a glare reducing optical recognition system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Lighting conditions play a role in the efficacy of all optical character recognition (OCR) machines. If the provided light is too bright, characters are possibly washed out completely. If there is not enough provided light, there will not be enough contrast when binarizing an image or converting a grey scale image to a black and white image. With the large variability of mail packaging types or objects, there is a need to handle both types of situations, both glare and shadowing, simultaneously.

Specular reflection is caused by lighting conditions that interact with packaging material in such a way as to completely or substantially reflect large amounts of light directly into a camera lens. For example, some packages or objects utilize a highly reflective packaging material which can cause whiteouts on the package or object. Another potential problem is shadow cast onto a workdesk or work surface in which the package or object is placed. Shadow cast makes proper calibration of the workdesks or work surfaces impossible due to the uneven light levels, which can add to the number of rejects per mail stream. Additionally, often lighting conditions are not uniformly spread across a warehouse where these workdesks or work surfaces are stored, thereby causing additional problems.

There have been a few solutions to these problems. The first solution is to diffuse the light sources above the workdesks. However, because of the warehouse environment that the workdesks are often stored in, the florescent light will essentially act as a point source light, which gives a much higher probability to induce glare. The second solution is to try to control the lighting in the warehouse. This in itself is a large feat, as it involves moving pre-set lighting fixtures throughout the warehouse and is still not guaranteed to get rid of glare.

Illustrated in FIG. 1 of the accompanying drawings is a glare reducing optical recognition system 20 that addresses these problems. The glare reducing optical recognition system 20 includes a first light emitter 22 configured and arranged to emit light in a first direction 31 and a second light emitter 24 configured and arranged to emit light in a second direction 33 different from the first direction 31. The system 20 also includes an image capturing device 26 positioned between the first light emitter 22 and the second light emitter 24. The first light emitter 22, the second light emitter 24, and the image capturing device 26 are placed above an alphanumeric text 28 wherein the image capturing device 26 is placed directly above the alphanumeric text 28 such that the first light emitter 22 is positioned to the left of the alphanumeric text 28 and the second light emitter 24 is positioned to the right of the alphanumeric text 28. The alphanumeric text 28 includes letters of the alphabet, numbers, punctuation marks, mathematical symbols, and other conventional symbols. In one form, the alphanumeric text 28 includes address information of a mail recipient such as a name, street, post office box, city, state, country, and zip code or other such information. The first light emitter 22, the second light emitter 24, and the image capturing device 26 are fixed in position on a stand 27 vertically above the alphanumeric text 28, which is placed on a flat surface 32. The alphanumeric text 28 is fixed or placed on an object 30 that includes a package, letter, document, box, or envelope. The flat surface 32 includes an area of deskspace, a stand, a workstation, a work surface, or a conveyance system that feeds multiple examples of alphanumeric text 28 to the system 20 in a sequential order.

The first light emitter 22 emits a controlled beam of light represented by a central light ray 34 in a first direction 31 towards the alphanumeric text 28 which is then reflected upwards or away from the alphanumeric text 28. The first direction 31 is downward at an angle towards the alphanumeric text 28 as measured with respect to the central light ray 34. Similarly, the second light emitter 24 emits a controlled beam of light represented by a central light ray 36 in a second direction 33 towards the alphanumeric text 28 which is then reflected upwards or away from the alphanumeric text 28, wherein the second direction 33 is different from the first direction 31 of the first light emitter 22. The second direction 33 is downward at an angle towards the alphanumeric text 28 as measured with respect to the central light ray 36. In one form, the central light ray 34 emitted from the first light emitter 22 forms an angle A of between forty-five and one-hundred and thirty-five degrees with the central light ray 36 that is emitted from the second light emitter 24. In another form, the angle A is between seventy and one-hundred and ten degrees. In one embodiment, the angle A is ninety degrees. In yet another form, the central light ray 34 emitted from the first light emitter 22 in the first direction forms an angle B with an axis perpendicular to the image capturing device 26. The angle B is between thirty degrees and sixty degrees and in one form is forty-five degrees. Further, the central light ray 36 that is emitted from the second light emitter 24 forms an angle C with the axis perpendicular to the image capturing device 26. The angle C is between thirty degrees and sixty degrees and in one form is forty-five degrees.

The first and the second light emitters 22 and 24, respectively, are configured to emit light in the visible light spectrum and/or the non-visible light spectrum. The first and the second light emitters 22 and 24, respectively, are light emitting diodes (LED) or other light sources. In one embodiment, the first light emitter 22 emits the controlled beam of light in an equal amount as the second light emitter 24 emits the controlled beam of light. In another embodiment, the first light emitter 22 emits the controlled beam of light in a different amount as the second light emitter 24. In one form, the light emitted from the first light emitter 22 is polarized differently than the light emitted by the second light emitter 24.

Figure 3:
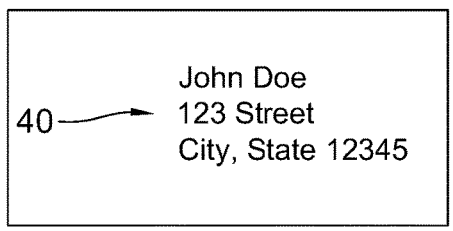
FIG. 3 illustrates a first image of alphanumeric text obtained from the glare reducing optical recognition system of FIG. 1.
Figure 4:
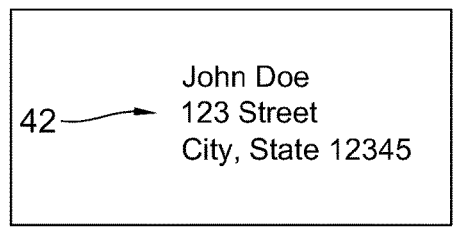
FIG. 4 illustrates a second image of the alphanumeric text obtained from the glare reducing optical recognition system of FIG. 1.

The image capturing device 26 is configured to capture a first image of alphanumeric text 40 illuminated by the first light emitter 22 emitting light in the first direction 31 when only the first light emitter 22 is emitting light, illustrated in FIG. 3. As such, the second light emitter 24 is not emitting light and is off while the first light emitter 22 is on and emitting light. The image capturing device 26 is configured to capture a second image of alphanumeric text 42 illuminated by the second light emitter 24 emitting light in the second direction 33 when only the second light emitter 24 is emitting light, illustrated in FIG. 4. As such, the first light emitter 22 is not emitting light and is off while the second light emitter 24 is on and emitting light. The image capturing device 26 is configured to capture images in the visible light spectrum and non-visible light spectrum.

Alternatively, the image capturing device 26 is configured to capture the first image of alphanumeric text 40 illuminated by the second light emitter 24. In this alternative embodiment, the first light emitter 22 is off when the second light emitter 24 is on and emitting light. Further, the image capturing device 26 is configured to capture the second image of alphanumeric text 42 illuminated by the first light emitter 22. As such, the second light emitter 24 is off while the first light emitter 22 is on and emitting light. Any combination of emitting light by the first light emitter 22 and/or the second light emitter 24 wherein one of the either the first or the second light emitters 22 and 26 is 24 on and the other of the first or the second light emitters 22 and 24 is off while the image capturing device 26 captures images of the alphanumeric text 40 is possible.

The image capturing device 26 includes a camera 46, which is placed directly above the alphanumeric text 28. The image capturing device 26 is configured to capture images of the alphanumeric text 28 at varying focal lengths. In the illustrated embodiment, the image capturing device 26 is connected to an image processor 50 which processes the alphanumeric text 28, the first image of alphanumeric text 40, and the second image of alphanumeric text 42 to construct a glare reduced image 100, which is described in more detail below. The first image of alphanumeric text 40 and the second image of alphanumeric text 42 are of a substantially same target area. In another embodiment, the image capturing device 26 includes an image processor that is configured to construct the glare reduced image 100.

The image processor 50 is a computer or other processor configured to process the alphanumeric text 28. The image processor 50 includes a character recognition processor 52 configured to automatically perform optical character recognition on the first image of alphanumeric text 40 and the second image of the alphanumeric text 42 to form the glare reduced image. The image processor 50 includes a display 54, an input device 56 such as a keyboard or mouse, and a memory or storage device 58 in which the captured images are stored. The image processor 50 is connected to the display 54, the input device 56, and the memory 58 by a communications bus (not shown) in a known manner.

The image capturing device 26 is connected to the image processor 50 by an appropriate electrical cable 62. This cable 62 carries the first image of alphanumeric text 40 and the second image of the alphanumeric text 42 to the image processor 50 for processing. The cable 62 also carries control signals from image processor 50 to the image capturing device 26. These signals turn the first and the second light emitters 22 and 24, respectively, on and off as required, and also control the initiation of the capture of the first image of alphanumeric text 40 and the second image of the alphanumeric text 42 by the image capturing device 26.

Figure 5:
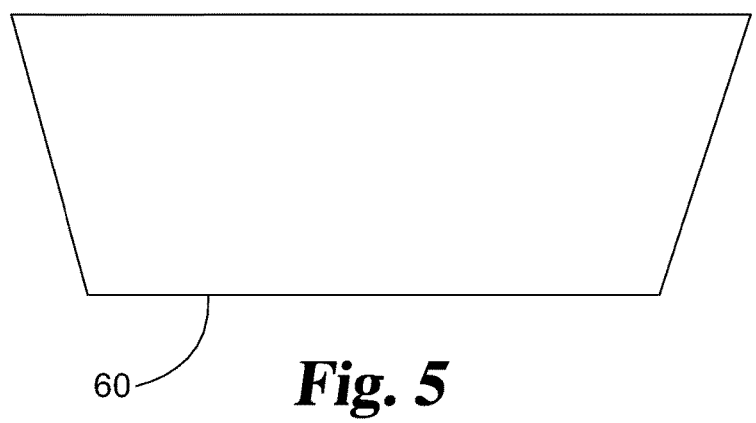
FIG. 5 illustrates a front view of a hood from the glare reducing optical recognition system of FIG. 1.

In one form illustrated in FIGS. 1 and 5, the system 20 includes a hood 60 positioned above the first light emitter 22, the second light emitter 24, and the image capturing device 26. The hood 60 is configured and arranged to inhibit ambient light from reaching the alphanumeric text 28. The hood 60 is configured to extend over the first light emitter 22, the second light emitter 24, and the image capturing device 26 to block any or significantly reduce light that may be emitted from a different light source that is typically located above the first light emitter 22, the second light emitter 24, and the image capturing device 26. For example, the different light source includes a florescent light or other lighting. The hood 60 has a length and a width sufficient to block or significantly reduce any light emitted from the different light source. The hood 60 can have any shape that extends over the first light emitter 22, the second light emitter 24, and the image capturing device 26. For example, the hood 60 can be rectangular, square, trapezoidal, or other shapes.

In another form illustrated in FIG. 1, the system 20 includes a label producing apparatus 70 that is configured and arranged to produce a label encoded with identification information obtained from the optical character recognition of the alphanumeric text 28 and/or the glare reduced image 100. Optionally, the label producing apparatus 70 is configured and arranged to produce a label with information encoded in a different format as the information encoded in the alphanumeric text 28. The different format of the information on the label can be machine readable or a barcode. The label producing apparatus 70 is attached to the image processor 50 by an appropriate electrical cable 72. In one form, the label includes name, street address, city, state, country, and zip code information obtained from the optical character recognition of the alphanumeric text 28.

In another form illustrated in FIG. 1, the system 20 includes a sensor 80 configured and arranged to trigger the capture of images when alphanumeric text 28 is within the field of view of the image capturing device 26. The sensor 80 is positioned and mounted under the flat surface 32 such that the alphanumeric text 28 on the object 30 is positioned on or over the sensor 80. The sensor 80 is configured to sense the weight of the object 30. The system 20 includes an association processor 82 coupled to the sensor 80 that is configured and arranged to associate weight information or other identification information of the object 30 with information obtained from optical character recognition of the alphanumeric text 28 of the object 30. Further, the image capturing device 26 is configured to capture the first image of alphanumeric text 40 illuminated by the first light emitter 22 in response to changes of weight of the object 30 sensed by the sensor 80 and the association processor 82. In one form, the weight of the object 30 or the parcel is sensed by the sensor 80 using a differential algorithm.

In another form, the system 20 includes a leveling apparatus (not illustrated) that is attached to the stand 27. The leveling apparatus is configured to enable adjustment of the first light emitter 22 and the second light emitter 24 to a level orientation relative to the image capturing device 26. As such, the leveling apparatus ensures the first light emitter 22 is level or aligned with the second light emitter 24 such that both of the first and the second light emitters 22 and 24 are level and aligned with the image capturing device 26. Alternatively, the leveling apparatus is used to align or level one of either the first light emitter 22 or the second light emitter 24 with the image capturing device 26.

Figure 2:
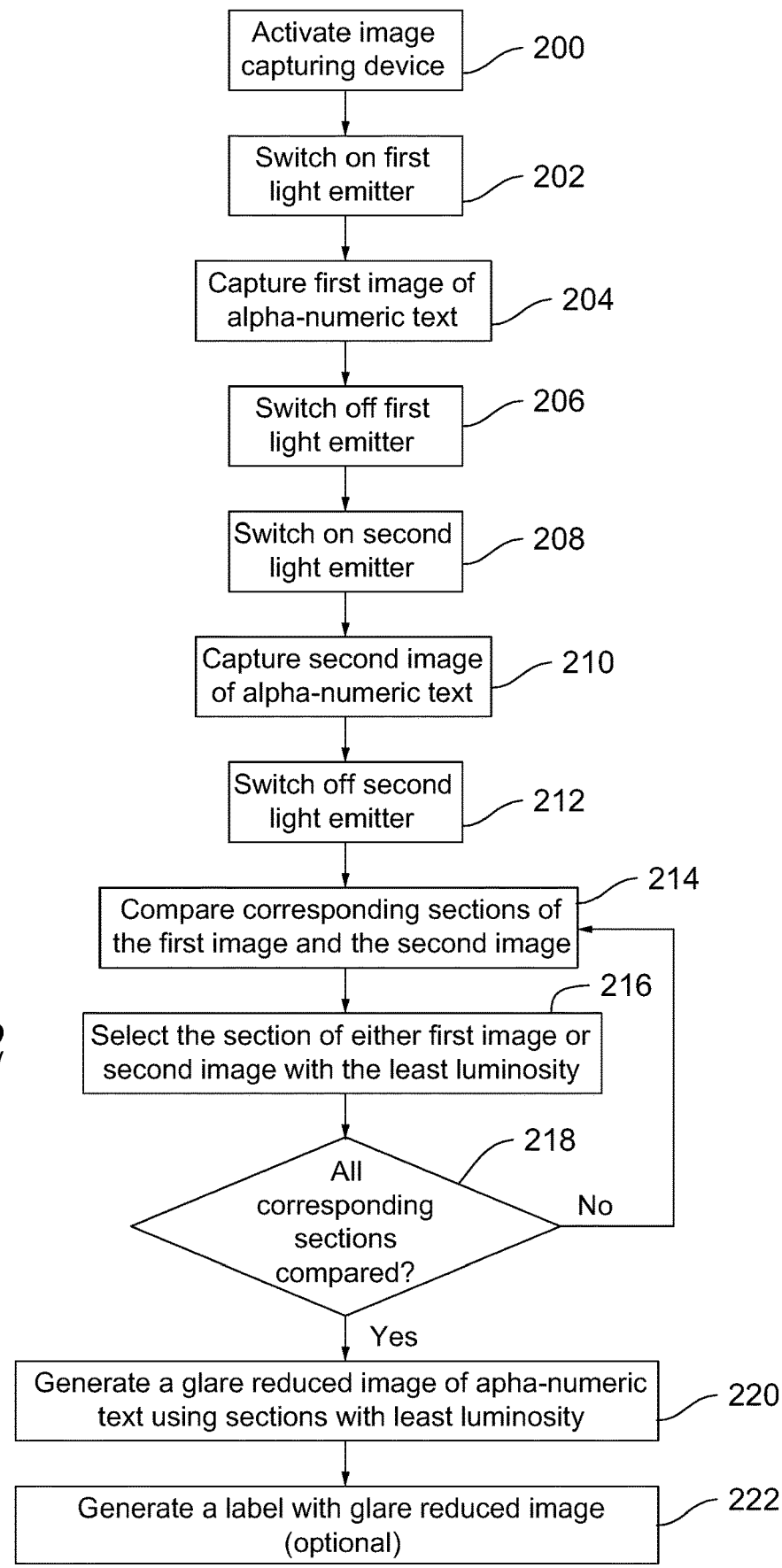
FIG. 2 illustrates a flowchart of a method for capturing a glare reduced image obtained from the glare reducing optical recognition system of FIG. 1.

In use of the glare reducing optical recognition system 20 as illustrated in FIG. 2, the object 30 having the alphanumeric text 28 is positioned below the image capturing device 26. The object 30 is positioned equidistant or approximately equidistant between the first light emitter 22 and the second light emitter 24. The object 30 is placed on the flat surface 32 such that the alphanumeric text 28 is within a field of view of the image capturing device 26. The alphanumeric text 28 is substantially stationary compared to the image capturing device 26 during the capture of both the first image of the alphanumeric text 40 and the second image of the alphanumeric text 42. The operation is initiated by a user. Alternatively, the operation is initiated automatically after the sensor 80 senses the weight of the object 30 on the flat surface 32 and the capture of the first image of the alphanumeric text 40 or the second image of the alphanumeric text 42 is automatic in response to the sensor 80. If the user initiates the operation, the user presses a button on the input device 56. Upon receipt of the user input or signals from the sensor 80, the image processor 50 issues a sequence of control signals along the electrical cable 62 to the image capturing device 26 to activate or turn ON 200 the image capturing device 26 to complete the capture process of the glare reduced image 100.

After activating 200 the image capturing device 26, the image processor 50 issues a control signal to the first light emitter 22 to switch ON 202 the first light emitter 22 so that the first light emitter 22 illuminates the alphanumeric text 28 with light in the first direction 31. The image processor 50 issues a control signal to the image capturing device 26 to capture 204 the first image of the alphanumeric text 40 when the alphanumeric text 28 is illuminated by the first light emitter 22. The first image of the alphanumeric text 40 is downloaded to the image processor 50 along the cable 62 and stored in the memory 58. The image processor 50 issues a control signal to the first light emitter 22 to switch OFF 206 the first light emitter 22 so that the first light emitter 22 does not emit light.

The image processor 50 next issues a control signal to the second light emitter 24 to switch ON 208 the second light emitter 24 so that the second light emitter 24 illuminates the alphanumeric text 28 with light in the second direction 33 that is different from the first direction 31. The image processor 50 issues a control signal to the image capturing device 26 to capture 210 the second image of the alphanumeric text 42 when the alphanumeric text 28 is illuminated by the second light emitter 24. The second image of the alphanumeric text 42 is downloaded to the image processor 50 along the cable 62 and stored in the memory 58. The image processor 50 issues a control signal to the second light emitter 24 to switch OFF 212 the second light emitter 24 so that the second light emitter 24 does not emit any light. The order of capture of the first image of alphanumeric text 40 and the second image of alphanumeric text 42 can be reversed.

Alternatively, the image processor 50 issues a control signal to the image capturing device 26 to capture the first image of alphanumeric text 40 illuminated by the second light emitter 24. In this alternative embodiment, the first light emitter 22 is off when the second light emitter 24 is on and emitting light. Further, the image processor 50 can issue another control signal to the image capturing device 26 to capture the second image of alphanumeric text 42 illuminated by the first light emitter 22. As such, the second light emitter 24 is off while the first light emitter 22 is on and emitting light. Any combination of emitting light by the first light emitter 22 and/or the second light emitter 24 wherein one of the either the first or the second light emitters 22 and 24 is on and the other of the first or the second light emitters 22 and 24 is off while the image capturing device 26 captures images of the alphanumeric text 40 is possible.

In another embodiment, the image processor 50 issues a control signal to the image capturing device 26 to capture multiple alphanumeric texts 28 that include the corresponding first image of the alphanumeric text 40 and the second image of the alphanumeric text 42.

Figure 6:
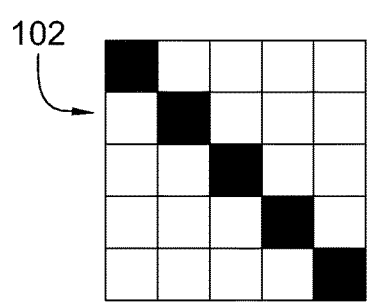
FIG. 6 is a schematic illustration of one embodiment of a selected section of a first image of alphanumeric text of the glare reducing optical recognition system of FIG. 1.
Figure 7:
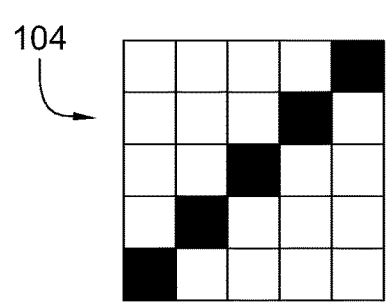
FIG. 7 is a schematic illustration of one embodiment of a selected section of a second image of alphanumeric text of the glare reducing optical recognition system of FIG. 1.
Figure 8:
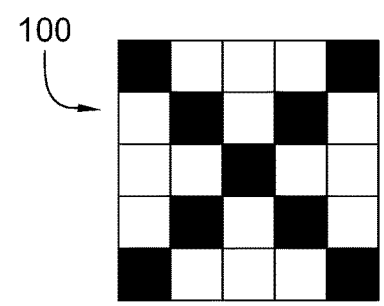
FIG. 8 is a schematic illustration of one embodiment of a glare reduced image constructed by combining the selected section of FIG. 3 and the selected section of FIG. 4.

The image processor 50 has captured the first image of alphanumeric text 40 and the second image of alphanumeric text 42 and compares 214 corresponding sections of the first image of alphanumeric text 40 to corresponding sections of the second image of alphanumeric text 42. The image processor 50 selects 216 the section with the least luminosity to populate a corresponding section of the glare reduced image. Specifically, the image processor 50 performs the selection 216 by comparing the pixels of the first image of alphanumeric text 40 and the pixels of the second image of alphanumeric text 42 and picking the darkest pixels. Illustrated in FIG. 6 is a first corresponding section 102 of the first image of alphanumeric text 40 showing a grid of pixels (5×5) wherein the darkest pixels are selected. Illustrated in FIG. 7 is a second corresponding section 104 of the second image of alphanumeric text 42 showing a grid of pixels (5×5) wherein the darkest pixels are selected. As can be appreciated, the first corresponding section 102 and the second corresponding section 104 are of the same pixel area; however, the first corresponding section 102 and the second corresponding section 104 illustrate the darkest pixels that were saved in the image processor 50 from the same pixel area from the first image of alphanumeric text 40 and the second image of alphanumeric text 42, respectively.

The image processor 50 continues comparing 218 the corresponding sections of the first image of alphanumeric text 40 to the corresponding sections of the second image of alphanumeric text 42 until all of the sections of the first image of alphanumeric text 40 and all of the sections of the second image of alphanumeric text 42 have been compared. The image processor 50 generates or creates 220 the glare reduced image 100 of the alphanumeric text 28 by selecting the sections with the least luminosity or darkest pixels to populate the corresponding sections of the glare reduced image 100.

The glare reduced image 100 is stored in the memory 58 and the user is prompted to initiate capture of a different image or to end the capturing process. The stored image can be displayed on the display 54, printed, or processed further. To print the stored image, the image processor 50 sends signals to the label producing apparatus 70 to generate or print 222 a label with the glare reduced image 100 or the label is encoded with information obtained from the glare reduced image 100. Optionally, the information encoded on the label is in a different format as the information encoded in the glare reduced image 100, such as machine readable or a barcode. The label with the glare reduced image 100 printed thereon can be attached to the object 30. If the user inputs that no more images are necessary, then the image capturing device 26 is deactivated and the process ends.

Figure 9:
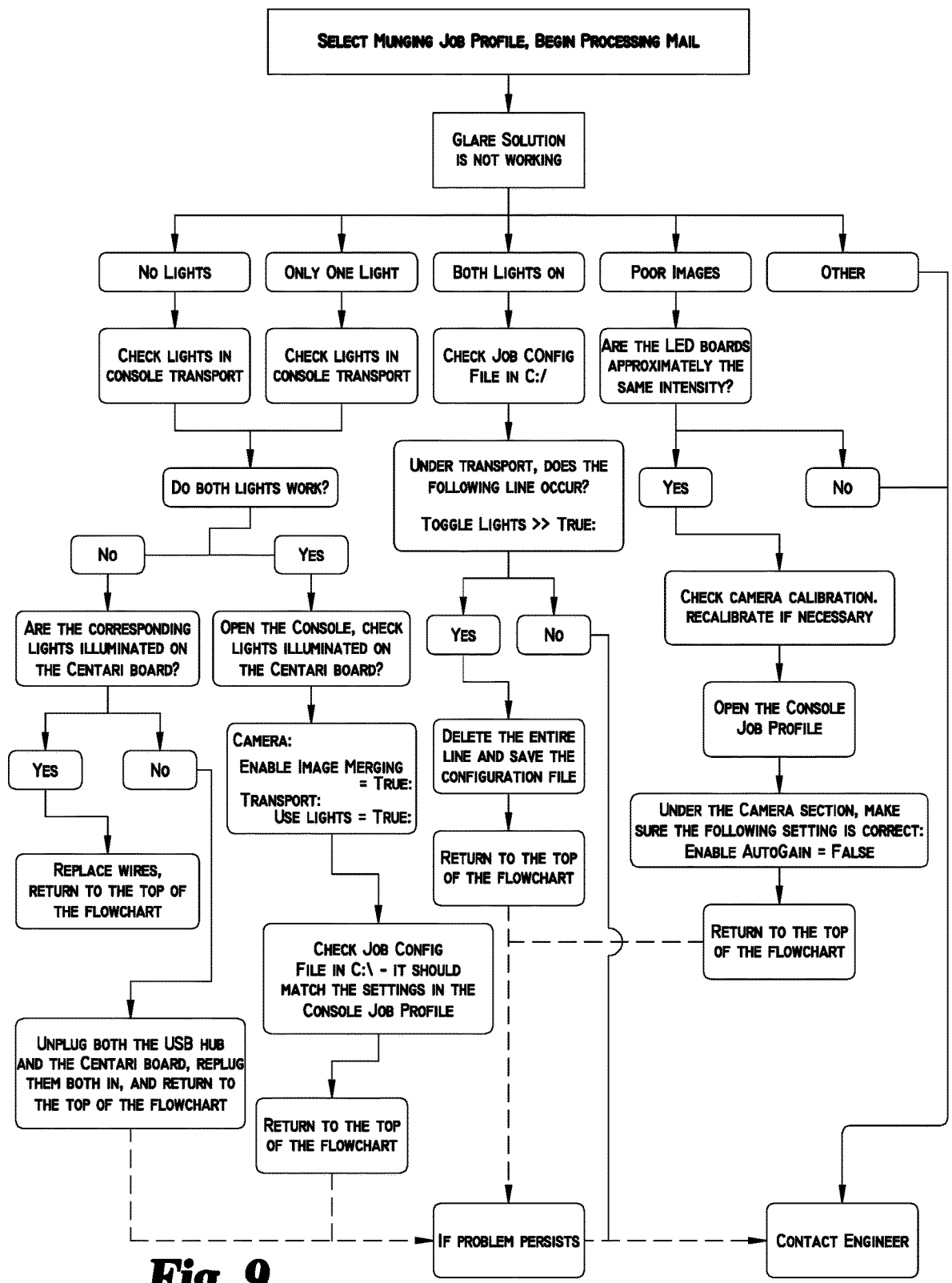
FIG. 9 illustrates a flowchart of a method for trouble shooting a method for capturing a glare reduced image obtained from the glare reducing optical recognition system of FIG. 1.

Illustrated in FIG. 9 is a flowchart of a method for trouble shooting a method for capturing the glare reduced image 100 obtained from the glare reducing optical recognition system 20.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A glare reducing optical recognition system for recognizing alphanumeric text, comprising:
a first light emitter configured and arranged to emit light in a first direction;
a second light emitter configured and arranged to emit light in a second direction different from the first direction;
an image capturing device configured to capture:
a first image of alphanumeric text illuminated by the first light emitter emitting light in the first direction, and
a second image of the alphanumeric text illuminated by the second light emitter emitting light in the second direction;
an image processor configured to construct a glare reduced image by comparing sections of the first image with corresponding sections of the second image and selecting the section with the least luminosity to populate the corresponding section of the glare reduced image; and
a character recognition processor configured to automatically perform optical character recognition on alphanumeric text contained within the glare reduced image produced by said image capturing device.

2. The system according to claim 1, wherein said alphanumeric text is coupled to an object and the system further comprises an association processor configured and arranged to associate identification information of said object with information obtained from the optical character recognition of the alphanumeric text.

3. The system according to claim 1, wherein said alphanumeric text is address information and said identification information is a zip code determined from said address information.

4. The system according to claim 1, wherein a central light ray emitted from the first light emitter at the first direction forms an angle of between forty-five and one hundred and thirty-five degrees with the central light ray emitted from the second light emitter in the second direction.

5. The system according to claim 4, wherein said angle is between seventy and one hundred and ten degrees.

6. The system according to claim 5, wherein said angle is about ninety degrees.

7. The system according to claim 1, wherein the first image and the second image are of a substantially same target area.

8. The system according to claim 1, also comprising a hood configured and arranged to inhibit ambient light from reaching the alphanumeric text.

9. The system according to claim 1, further comprising a conveyance system configured and arranged to present multiple examples of alphanumeric text to the image capturing device sequentially.

10. The system according to claim 1, further comprising a sensor configured and arranged to trigger the capture of images when alphanumeric text is within the field of view of the image capturing device.

11. The system according to claim 1, wherein the image processor compares pixels between the first image and second image.

12. The system according to claim 1, wherein the image capturing device is configured to capture images at varying focal lengths.

13. A glare reducing optical capture system for addressed mail items that are weighed, comprising:
   a platform having a sensor configured and arranged to detect changes in weight caused by addressed mail parcels placed upon the platform;
   a first light emitter configured and arranged to emit light in a first direction;
   a second light emitter configured and arranged to emit light in a second direction different from the first direction;
   an image capturing device configured to capture:
      a first image of the address of a parcel of said addressed mail parcels illuminated by the first light emitter emitting light in the first direction, and
      a second image of the address of a parcel of said addressed mail parcels illuminated by the second light emitter emitting light in the second direction; and
   an image processor configured to construct a glare reduced image by comparing sections of the first image with corresponding sections of the second image and selecting the section with the least luminosity to populate the corresponding section of the glare reduced image.

14. The system according to claim 13, further comprising an association processor configured and arranged to associate weight information of a parcel of the addressed mail parcels with information obtained from optical character recognition of the address of the parcel.

15. The system according to claim 13, wherein said first image is captured in response to changes of weight sensed by the sensor.

16. A method for capturing a glare reduced image and processing the same, comprising:
   a. positioning alphanumeric text within a field of view of an image capturing device;
   b. illuminating the alphanumeric text with light emitted from a first light emitter configured and arranged to emit light in a first direction;
   c. capturing a first image of the alphanumeric text when the alphanumeric text is illuminated by the first light emitter with an image capturing device;
   d. illuminating the alphanumeric text with light emitted from a second light emitter configured and arranged to emit light in a second direction different from the first direction;
   e. capturing a second image of the alphanumeric text when the alphanumeric text is illuminated by the second light emitter with the image capturing device; and
   f. creating a glare reduced image of the alphanumeric text by comparing corresponding sections of the first image and the second image and selecting the section with the least luminosity to populate the corresponding section of the glare reduced image.

17. The method according to claim 16, wherein multiple alphanumeric texts are captured, each alphanumeric text having a corresponding captured first image, second image, and glare reduced image.

18. The method according to claim 16, wherein the sequence of illuminating the first light emitter and the second light emitter for subsequent alphanumeric texts follows the following pattern:
   a. first alphanumeric text image capture process: first light emitter used to capture first image, second light emitter used to capture second image; and
   b. second alphanumeric text image capture process: second light emitter used to capture first image, first light emitter used to capture second image.

19. The method according to claim 16, wherein the alphanumeric text is substantially stationary compared to the image capturing device during the capture of both the first image and the second image.

20. The method according to claim 16, wherein the capture of the first image is automatic in response to a sensor.

21. The method according to claim 16, wherein the light emitted from the first light emitter is polarized differently than the light emitted by the second light emitter.

* * * * *